United States Patent
Chen et al.

(10) Patent No.: US 7,307,838 B2
(45) Date of Patent: Dec. 11, 2007

(54) HARD DISC DRIVE CARRIER

(75) Inventors: Chao-Jung Chen, Taipei (TW); Hsiang-Wei Liu, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 193 days.

(21) Appl. No.: 11/242,684

(22) Filed: Oct. 4, 2005

(65) Prior Publication Data

US 2007/0041154 A1 Feb. 22, 2007

(30) Foreign Application Priority Data

Aug. 17, 2005 (TW) .............................. 94214068 U (51) Int. Cl.
*H05K 7/00* (2006.01)
(52) U.S. Cl. ...................................... 361/685; 361/727
(58) Field of Classification Search ................. 361/685, 361/727
See application file for complete search history.

(56) References Cited

U.S. PATENT DOCUMENTS

| 5,128,830 | A | * | 7/1992 | Deluca et al. | ............... | 361/695 |
| 5,751,551 | A | * | 5/1998 | Hileman et al. | ............ | 361/753 |
| 6,525,933 | B2 | * | 2/2003 | Eland | ......................... | 361/686 |
| 6,600,648 | B2 | * | 7/2003 | Curlee et al. | ............... | 361/685 |

* cited by examiner

*Primary Examiner*—Jayprakash Gandhi
*Assistant Examiner*—Ingrid Wright
(74) *Attorney, Agent, or Firm*—Thomas, Kayden, Horstemeyer & Risley (57) ABSTRACT

A hard disc drive carrier comprises a main body, a first element extending from the main body, a second element extending from the main body opposite to the first element with a hard disc disposed between the first and second elements, at least one first pad disposed on the first element, and at least one second pad disposed on the second element. The first and second elements serve as rails for the hard disc drive carrier sliding in a hard disc drive bay. When the hard disc drive carrier reaches a predetermined position in the hard disc drive bay, the first and second pads abuts the hard disc drive bay to avoid vibration between the hard disc drive carrier and the hard disc drive bay.

12 Claims, 9 Drawing Sheets

HARD DISC DRIVE CARRIER

BACKGROUND

The invention relates to a hard disc drive carrier, and in particular to a hard disc drive carrier with anti-vibration functions.

In a high density hard disc storage system, hard disc drives are fixed to hard disc drive carriers (hereinafter HDD carriers), and the HDD carriers are stored in a hard disc drive bay (hereinafter HDD bay). To accommodate as many hard disc drives as possible in a storage unit, the HDD carrier preferably has a simple structure. In addition, a gap is formed between the HDD carrier and the HDD bay to easily insert and withdraw the HDD carrier. When, an external vibration source vibrates the ground, the vibration level on HDD may be amplified due to the gap. This may damage the hard disc drives.

SUMMARY

An embodiment of a hard disc drive carrier comprises a main body, a first element extending from the main body, a second element extending from the main body opposite to the first element, at least one first pad disposed on the first element, and at least one second pad disposed on the second element. The first and second elements serve as rails for the hard disc drive carrier sliding in a hard disc drive bay. A hard disc is disposed between the first and second elements. When the hard disc drive carrier reaches a predetermined position in the hard disc drive bay, the first and second pads abut the hard disc drive bay to avoid vibration between the hard disc drive carrier and the hard disc drive bay.

The first element has at least one first engaging portion with which the first pad engages, whereby the first pad is fixed to the first element. The first pad engages the first engaging portion and protrudes from the first element to abut the hard disc drive bay when the hard disc drive carrier reaches the predetermined position.

The first engaging portion has a first notch and a second notch adjacent to the first notch, and the first and second notches are formed on one edge of the first element. The first engaging portion is adjacent to a position where the first element joins the main body. The first pad has a first engaging groove, a first protrusion disposed in the first engaging portion and a flat portion formed on one edge of the first engaging groove. When the first pad engages the first engaging portion, another edge of the first engaging groove engages the first notch, the first protrusion engages the second notch and the flat portion abuts the position where the first element joins the main body.

The second element has at least one second engaging portion with which the second pad engages, whereby the second pad is fixed to the second element. The second pad engages the second engaging portion and protrudes from the second element to abut the hard disc drive bay when the hard disc drive carrier reaches the predetermined position. The second engaging portion has a third notch and a fourth notch adjacent to the third notch, and the third and fourth notches are formed on one edge of the second element. The second pad has a second engaging groove and a second protrusion disposed in the second engaging groove. When the second pad engages the second engaging portion, one edge of the second engaging groove engages the third notch and the second protrusion engages the fourth notch.

BRIEF DESCRIPTION OF THE DRAWINGS

The invention can be more fully understood by reading the subsequent detailed description and examples with references made to the accompanying drawings, wherein:

FIG. 5b is a cross section along line A-A of FIG. 5a;

FIG. 7b is a cross section along line B-B of FIG. 7a; and

DETAILED DESCRIPTION

Figure 1A:
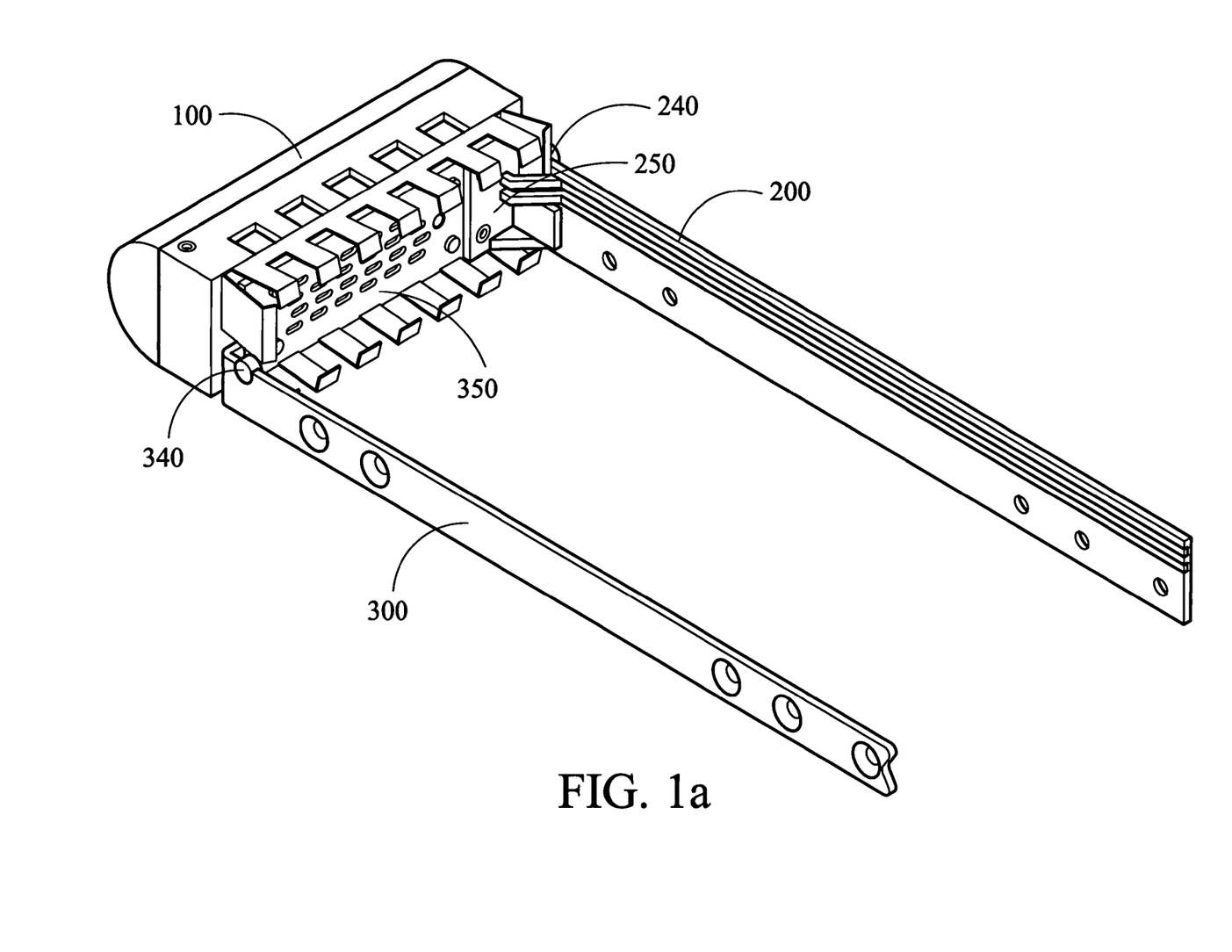
FIGS. 1a, 1b are perspective view of an embodiment of a HDD carrier.
Figure 1B:
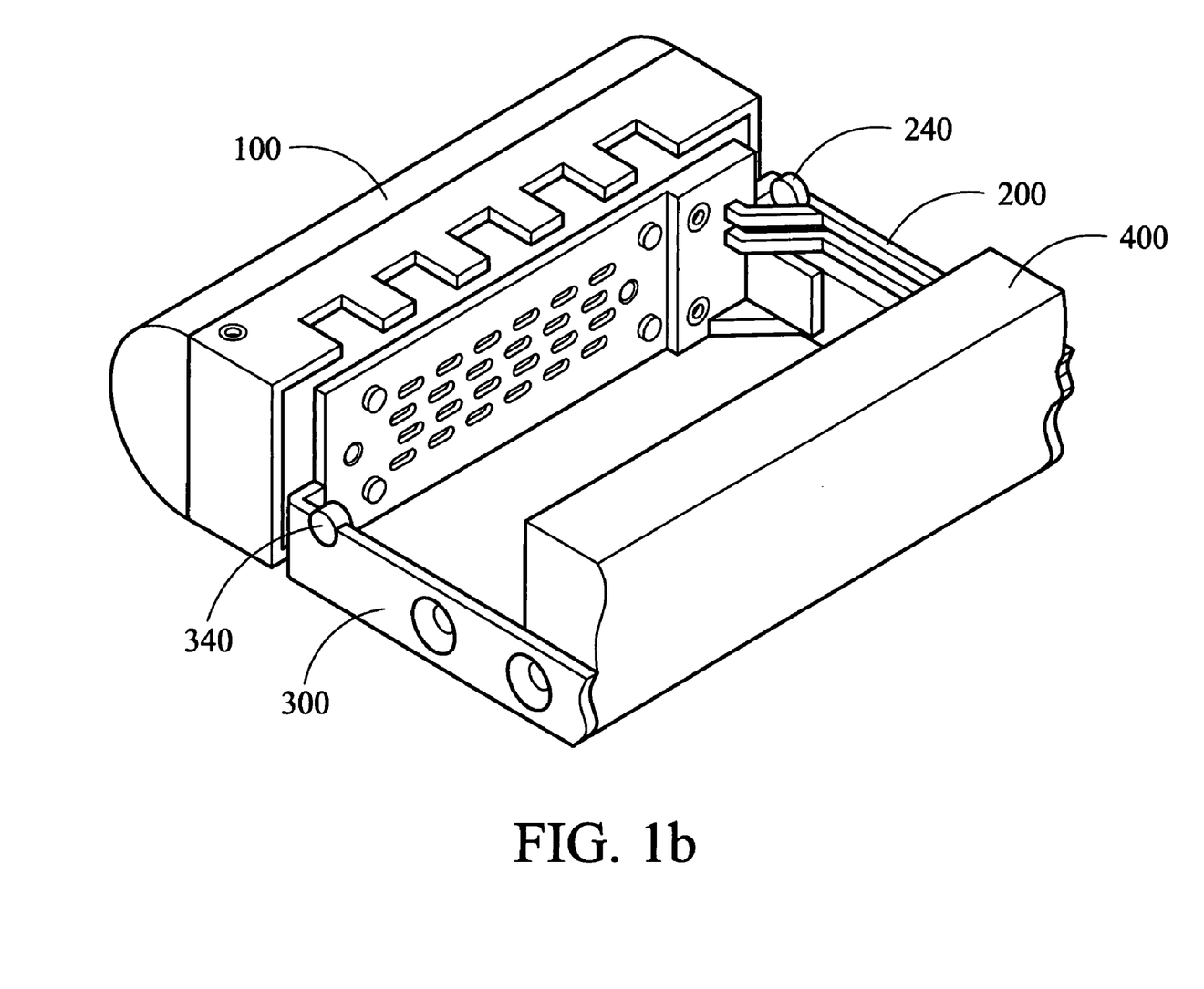

Referring to FIGS. 1a and 1b, an embodiment of an HDD carrier comprises a main body 100, a first element 200, a second element 300, a first pad 240 and a second pad 340. In FIG. 1a, the first element 200 and the second element 300 extend from opposite sides of the main body 100 respectively, whereby the HDD carrier is U-shaped. A hard disc drive 400 is secured between the first element 200 and the second element 300 via bolts as shown in FIG. 1b. The first pad 240 and the second pad 340 are engaged with the first element 200 and the second element 300 respectively and protrude from the first element 200 and the second element 300 respectively. In this embodiment, the second element 300 is L-shaped with one end 350 secured to the main body 100 and the other end extending from the main body 100. One end 250 of the first element 200 is fixed to the second element 300. The first element 200 is wider than the second element 300 to accommodate signal lead. In this embodiment, the first element 200 is substantially twice as wide as the second element 300.

Figure 2:
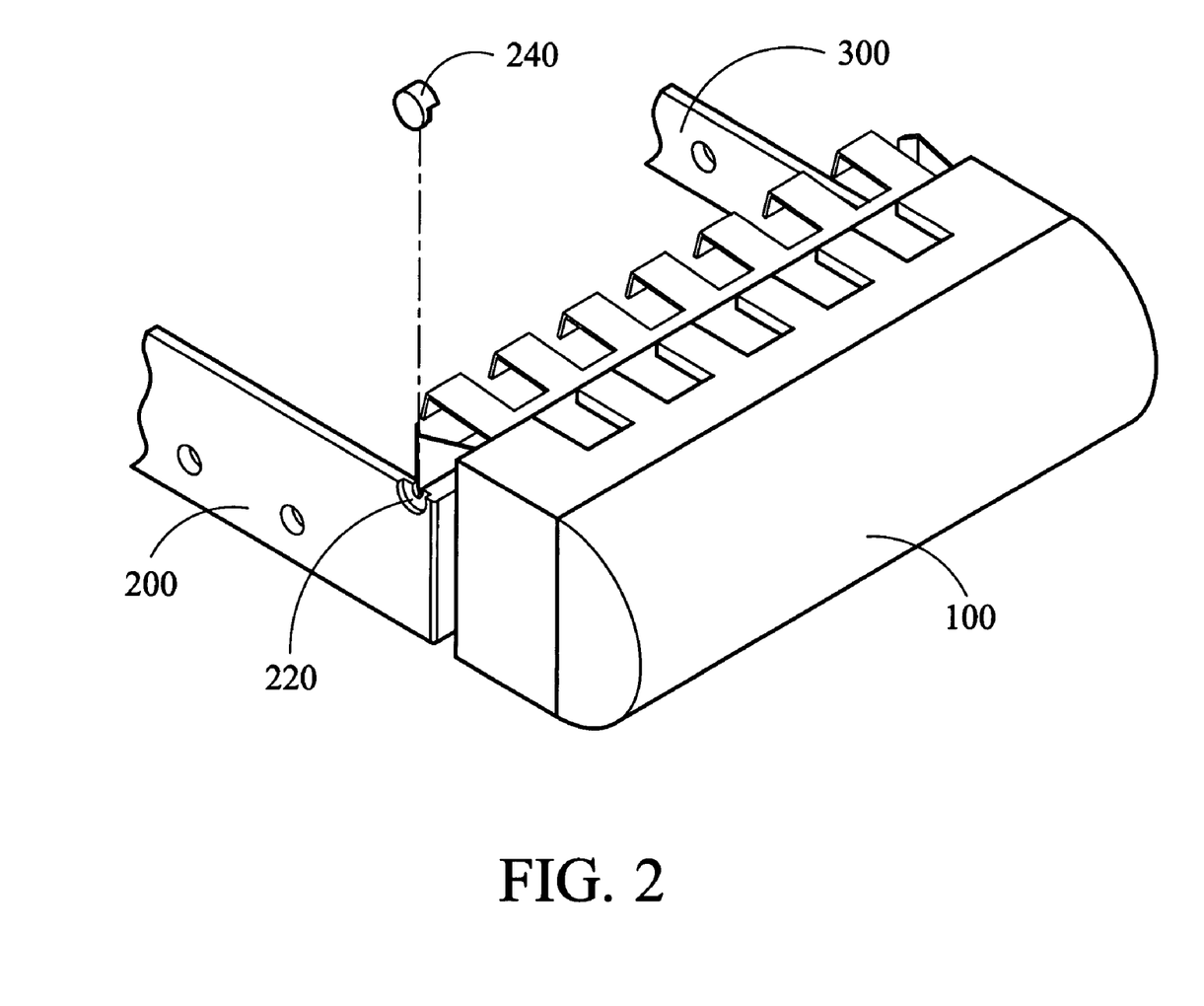
FIG. 2 is a schematic view showing the first pad engaging the first element.
Figure 3:
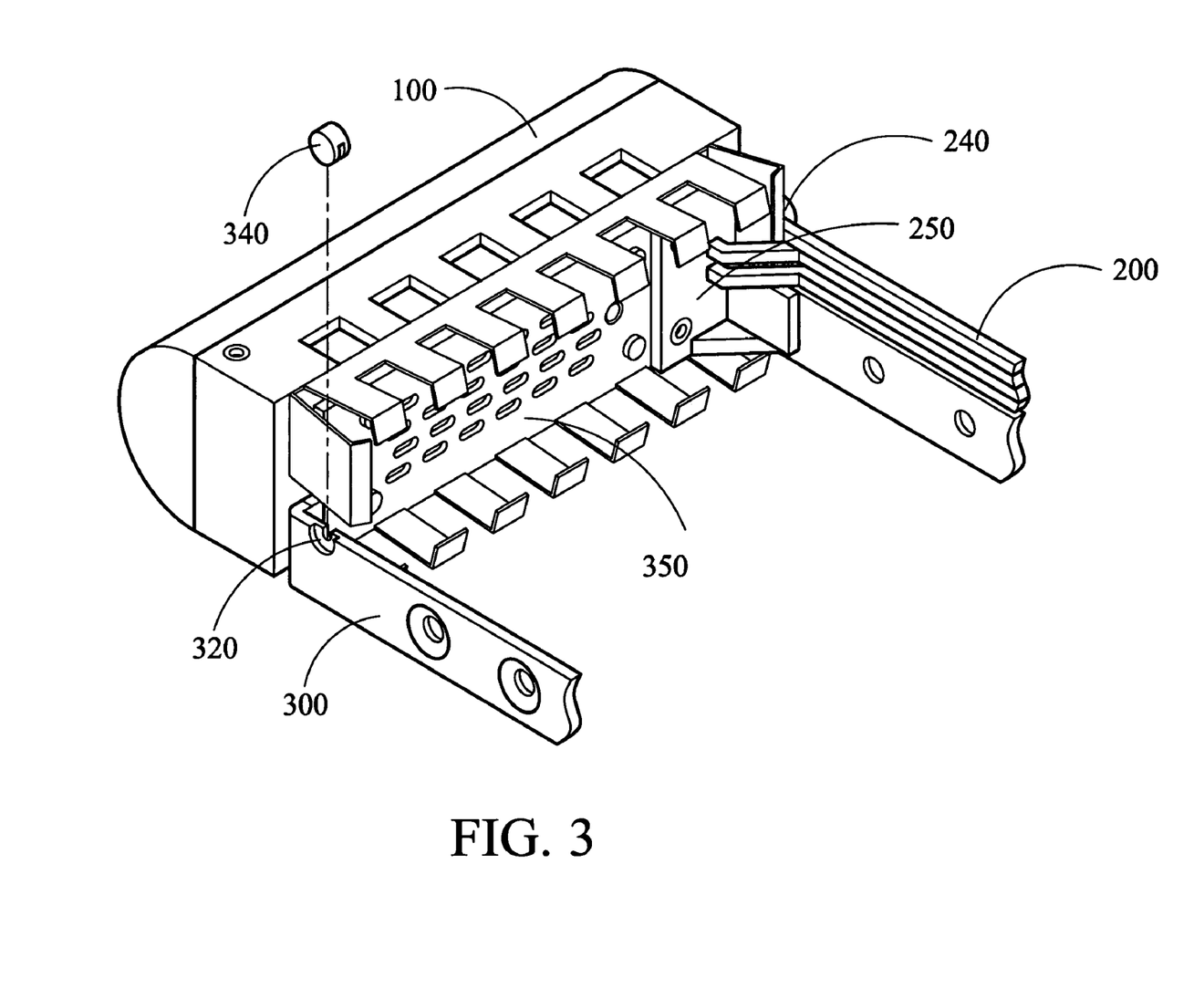
FIG. 3 is a schematic view showing the second pad engaging the second element.

Referring to FIGS. 2 and 3, the first element 200 has a first engaging portion 220, and the second element 300 has a second engaging portion 320. The first pad 240 engages the first engaging portion 220, and the second pad 340 engages the second engaging portion 320.

Figure 4:
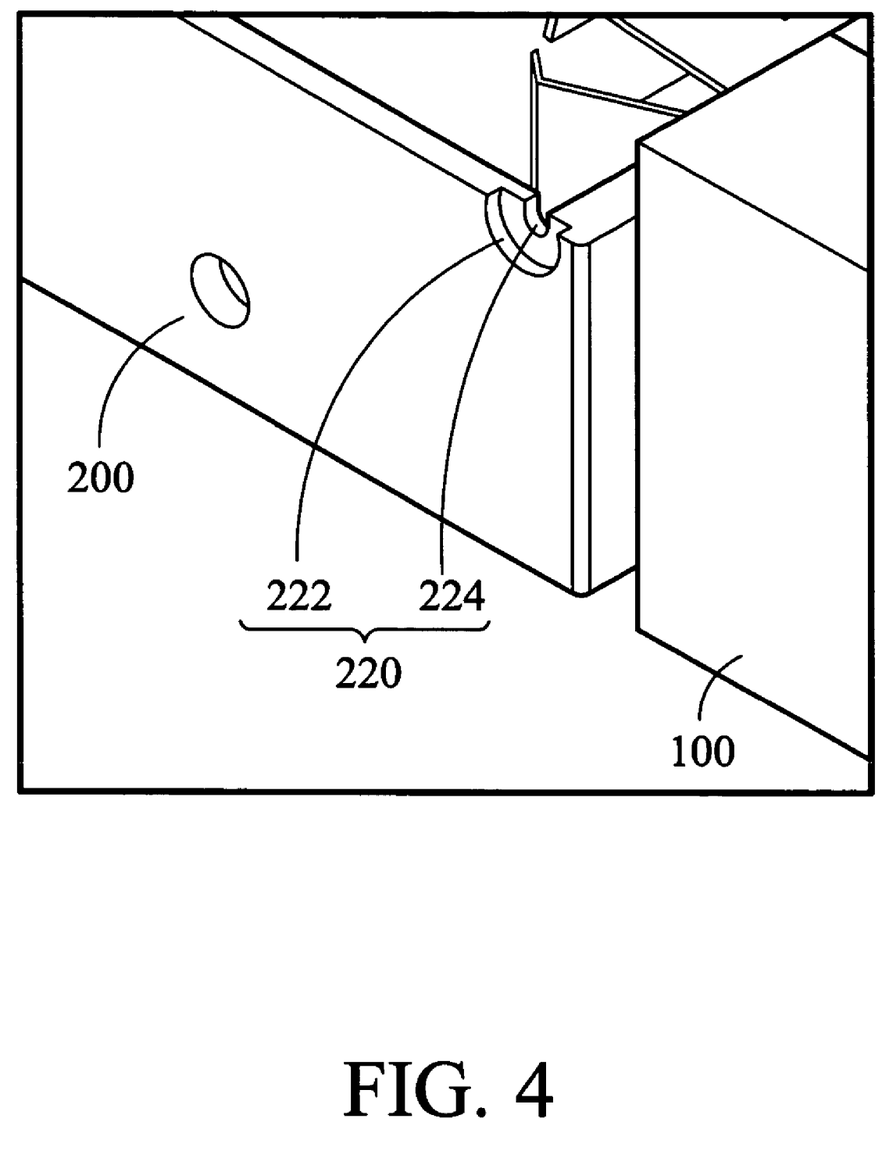
FIG. 4 is an enlarged view of the first engaging portion.
Figure 5A:
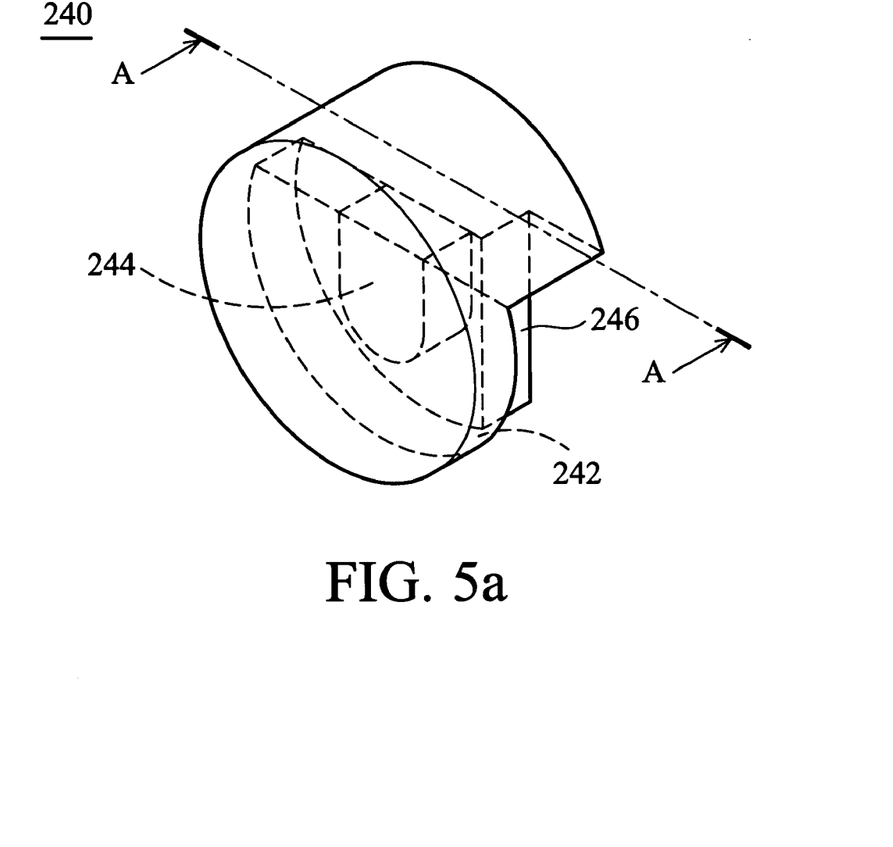
FIG. 5a is a perspective view of the first pad.
Figure 5B:
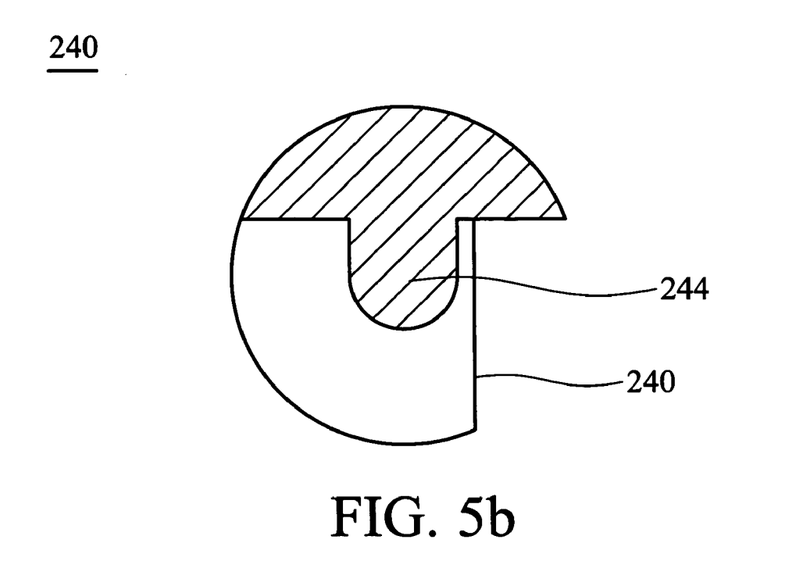

Referring to FIG. 4, the first engaging portion 220 comprises a first notch 222 and a second notch 224. The first notch 222 is larger than and adjacent to the second notch 224. In FIGS. 5a and 5b, the first pad 240 comprises a first engaging groove 242, a first protrusion 244 and a flat portion 246. The first protrusion 244 is disposed in the first engaging groove 242 and corresponds to the second notch 224. As the first engaging portion 220 is adjacent to the position where the first element 200 joins the main body 100, when the first pad 240 engages the first engaging portion 220, one edge of the first engaging groove 242 engages the first notch 222, the first protrusion 244 engages the second notch 224, and the flat portion 246 abuts the position where the first element 200 joins the main body 100.

Figure 6:
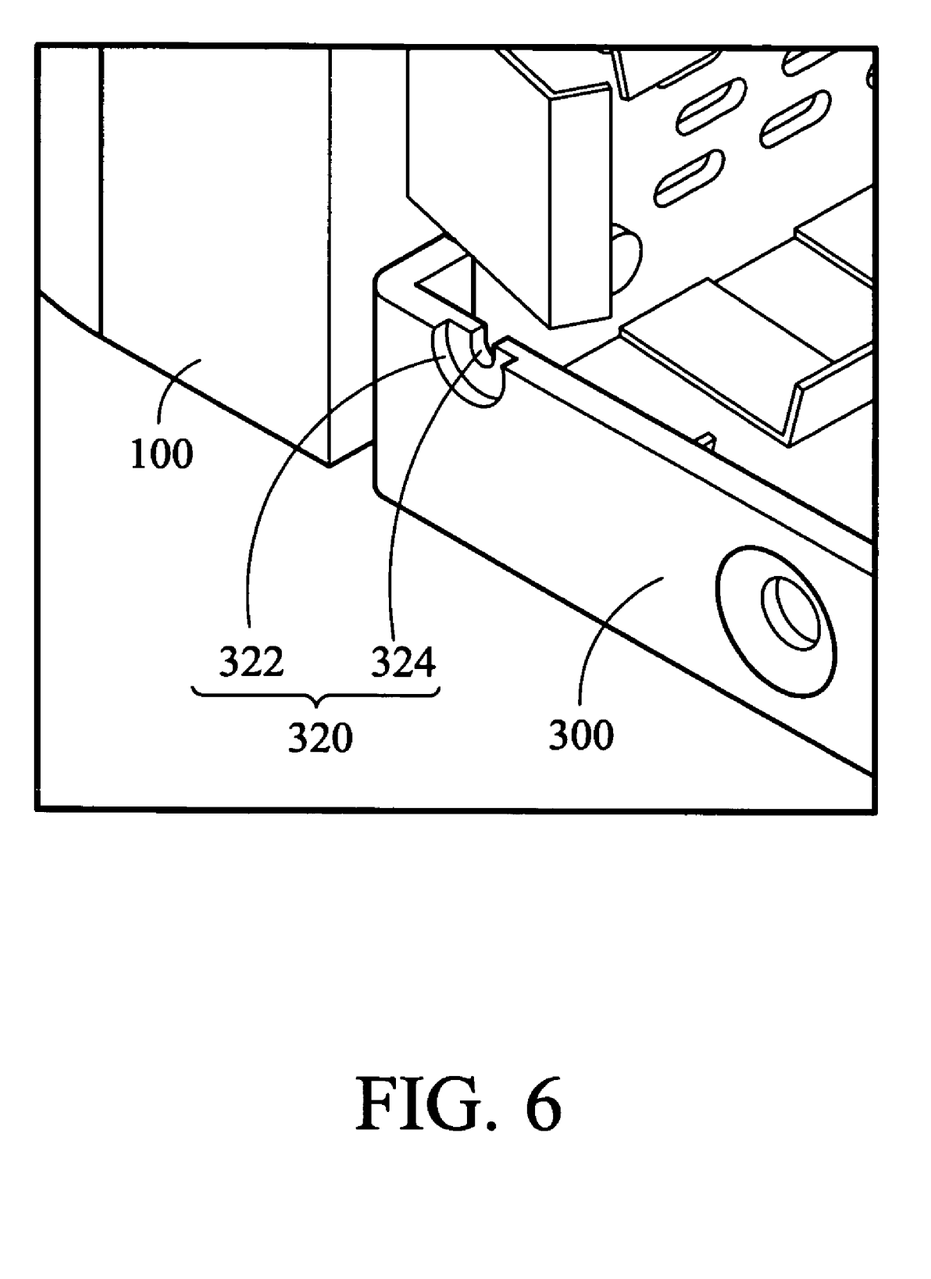
FIG. 6 is an enlarged view of the second engaging portion.
Figure 7A:
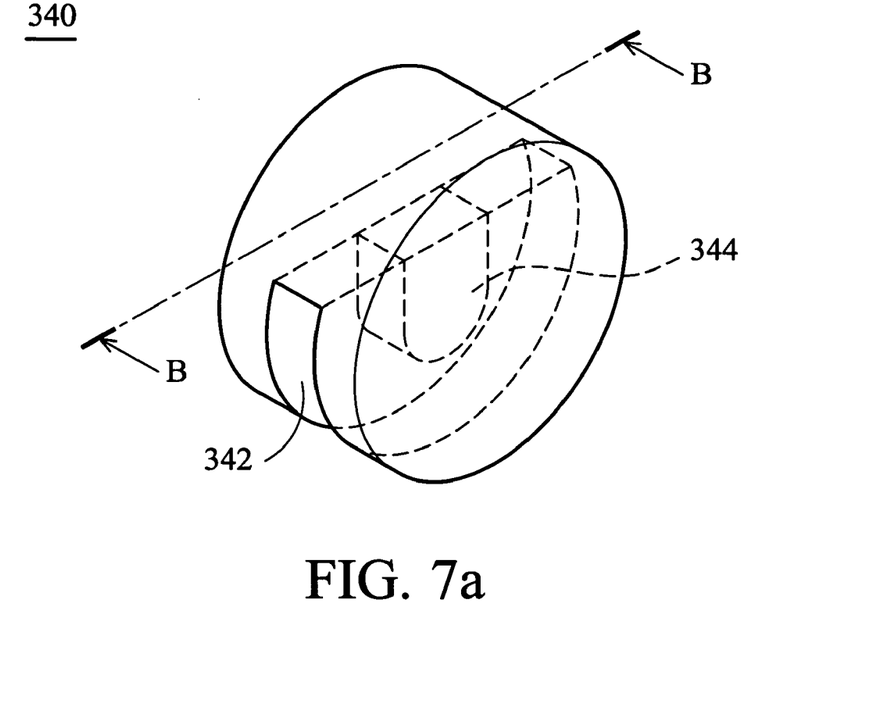
FIG. 7a is a perspective view of the second pad.
Figure 7B:
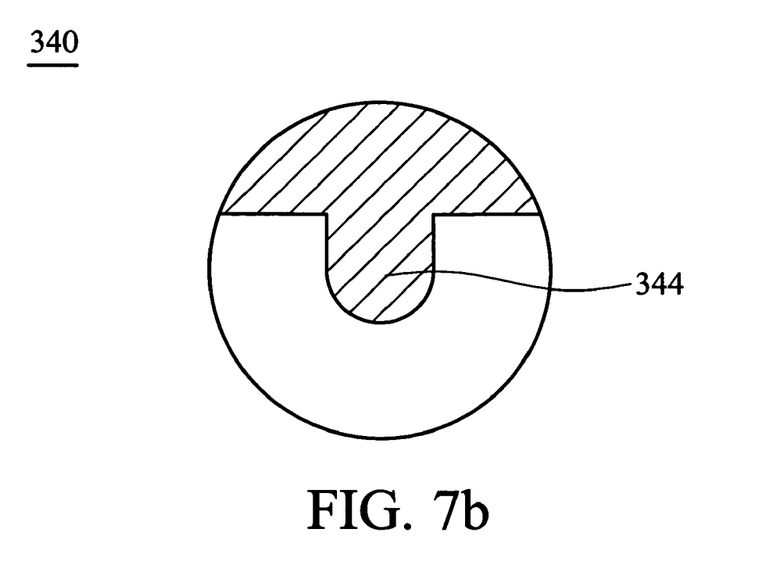

Referring to FIG. 6, the second engaging portion 320 comprises a third notch 322 and a fourth notch 324. The third notch 322 is larger than and adjacent to the fourth notch 324. In FIGS. 7a and 7b, the second pad 340 comprises a second engaging groove 342 and a second protrusion 344.

The second protrusion 344 corresponds to the fourth notch 324. When the second pad 340 engages the second element 300, one edge of the second engaging groove engages the third notch 322 and the second protrusion 344 engages the fourth notch 324.

Figure 8:
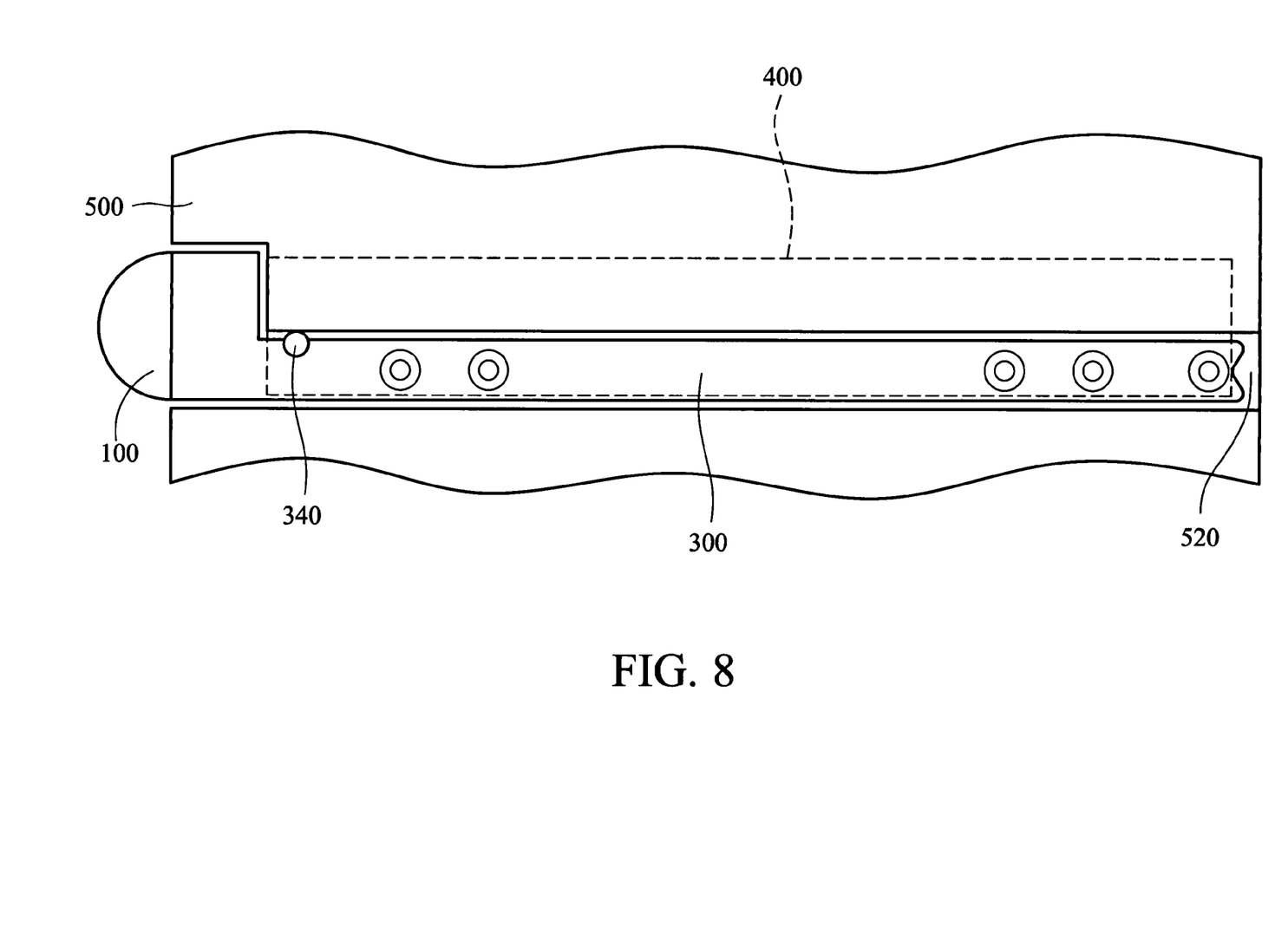
FIG. 8 is a schematic view showing the HDD carrier inserted into an HDD bay of a hard disc drive storage system.

FIG. 8 depicts the HDD carrier inserted into an HDD bay 520 of a hard disc storage system 500. When the HDD carrier is inserted into HDD bay 520, the first pad 240 and the second pad 340 protruding from the first element 200 and the second element 300 respectively abut the HDD bay 520 to eliminate the gap between the HDD carrier and the HDD bay 520, thereby damping vibration.

In addition, the first element 200 can be made of aluminum and formed by injection molding for less weight. In another aspect, the second element 300 can be made of steel for strength reinforcement.

The number of first pads 240 and the second pads 340 is not limited. Several first pads 240 and second pads 340 can be used. In such a condition, however, may be difficult pushing the HDD carrier into the HDD bay 520. The number of the first pads 240 and the second pads 340 is determined according to requirements.

The positions of the first pads 240 and the second pads 340 are also not limited. They can be positioned near the main body 100 and can also be disposed near the tail of the first element 200 and the second element 300. In such a condition, as the tail of the HDD carrier prevails, it is not easy for the HDD carrier to be inserted into the HDD bay 520.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hard disc drive carrier, comprising:
   a main body;
   a first element extending from the main body;
   a second element extending from the main body opposite to the first element with a hard disc disposed between the first and second elements;
   at least one first pad disposed on the first element; and
   at least one second pad disposed on the second element,
   wherein the first and second elements serve as rails for the hard disc drive carrier sliding in a hard disc drive bay, and when the hard disc drive carrier reaches a predetermined position in the hard disc drive bay, the first and second pads abut the hard disc drive bay to avoid vibration between the hard disc drive carrier and the hard disc drive bay;
   the first element has at least one first engaging portion with which the first pad engages, whereby the first pad is fixed to the first element;
   the first engaging portion has a first notch and a second notch adjacent to the first notch, and the first and second notches are formed on one edge of the first element;
   the first engaging portion is adjacent to a position where the first element joins the main body; and
   the first pad has a first engaging groove, a first protrusion disposed in the first engaging portion and a flat portion formed on one edge of the first engaging groove, and when the first pad engages the first engaging portion, another edge of the first engaging groove engages the first notch, the first protrusion engages the second notch and the flat portion abuts the position where the first element joins the main body.

2. The hard disc drive carrier as claimed in claim 1, wherein the first pad engages the first engaging portion and protrudes from the first element to abut the hard disc drive bay when the hard disc drive carrier reaches the predetermined position.

3. The hard disc drive carrier as claimed in claim 1, wherein the second element has at least one second engaging portion with which the second pad engages, whereby the second pad is fixed to the second element.

4. The hard disc drive carrier as claimed in claim 3, wherein the second pad engages the second engaging portion and protrudes from the second element to abut the hard disc drive bay when the hard disc drive carrier reaches the predetermined position.

5. The hard disc drive carrier as claimed in claim 4, wherein the second engaging portion has a third notch and a fourth notch adjacent to the third notch, and the third and fourth notches are formed on one edge of the second element.

6. The hard disc drive carrier as claimed in claim 4, wherein the second pad has a second engaging groove and a second protrusion disposed in the second engaging groove, and when the second pad engages the second engaging portion, one edge of the second engaging groove engages the third notch and the second protrusion engages the fourth notch.

7. The hard disc drive carrier as claimed in claim 1, wherein the width of the first element is larger than that of the second element.

8. The hard disc drive carrier as claimed in claim 7, wherein the width of the first element is twice as large as that of the second element.

9. The hard disc drive carrier as claimed in claim 1, wherein the first element is made of aluminum and formed by injection molding.

10. The hard disc drive carrier as claimed in claim 1, wherein the second element is L-shaped with one end fixed to the main body and the other end extending from the main body.

11. The hard disc drive carrier as claimed in claim 10, wherein the first element is fixed to one end of the second element, whereby the first element is fixed to the main body.

12. The hard disc drive carrier as claimed in claim 1, wherein the second element is made of steel.

* * * * *